Van Patten & Anthony.
Making Chains.
N° 55,560.   Patented Jun. 12, 1866.
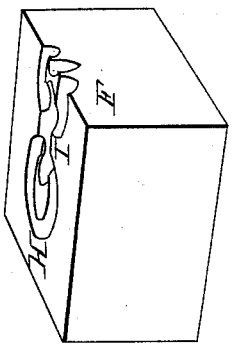
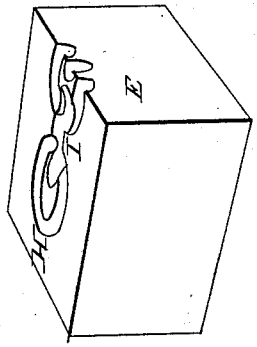
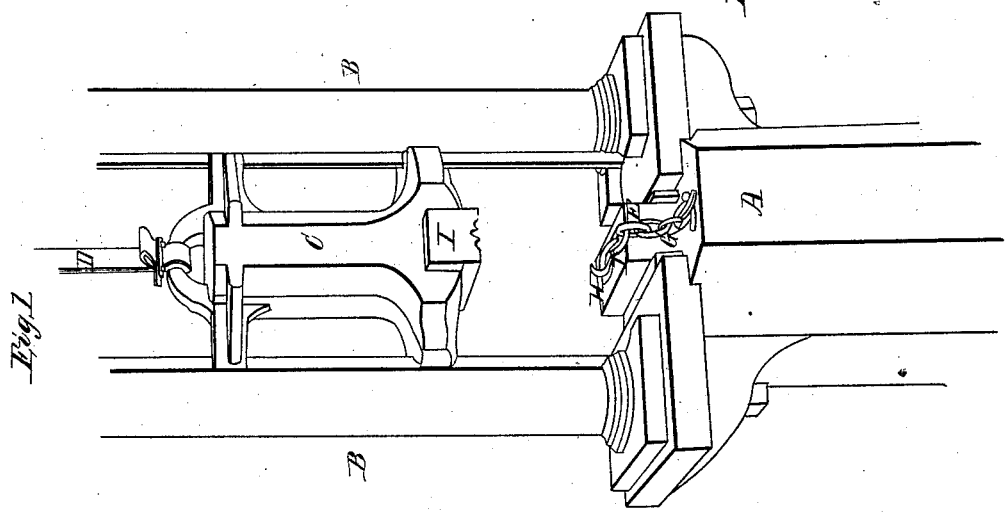
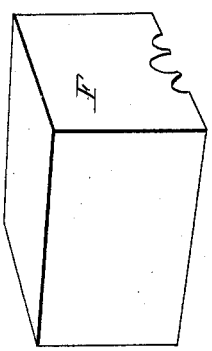
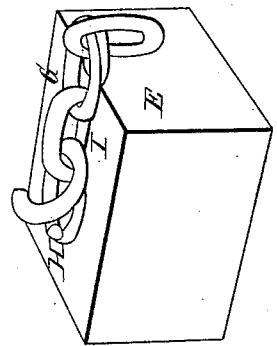
Witnesses.
M. D. Myers
He. He. Ingham
Inventors
Frederick Van Patten
Oren A. Anthony

UNITED STATES PATENT OFFICE.

FREDK. VAN PATTEN AND OREN A. ANTHONY, OF ILION, NEW YORK.

IMPROVEMENT IN DIES FOR WELDING LINKS INTO CHAINS.

Specification forming part of Letters Patent No. 55,560, dated June 12, 1866.

*To all whom it may concern:*

Be it known that we, FREDERICK VAN PATTEN and OREN A. ANTHONY, of Ilion, in the county of Herkimer and State of New York, have invented new and useful Improvements in Dies for Welding Links into Chains; and we do hereby declare that the following is a full and exact description thereof, reference being had to the accompanying drawings and letters of reference marked thereon.

Similar letters indicate the same devices in all the figures.

To enable others skilled in the art to make and use our invention, we will proceed to describe its nature, construction, and operation.

The nature of our invention consists in providing dies with suitable cavities or chambers for the reception of two or more links, said dies being placed under a drop-hammer or some other suitable machine, where they can be forced together for the purpose of welding links instantaneously into a chain while the metal possesses the proper degree of heat, thus forming a more perfect weld than can possibly be made by any other method, at the same time consolidating and refining the metal and giving each link a perfect and uniform shape.

Figure 1 represents a drop-press with the dies properly secured, one to the anvil A and the other to the hammer C. Fig. 2 shows the dies one above the other, the lower die having a portion of chain laid in its cavities, together with an open link as it appears when placed in the die preparatory to welding. Fig. 3 represents the dies with the upper one inverted, showing that the cavities or chambers are precisely alike.

A is the anvil of a drop-press; B, the standards; C, the hammer; D, the belt by which the hammer is elevated; E, the lower die, which is secured on the anvil; F, the upper die, which is secured to the lower part of the hammer; G, a portion of a chain; H, the point at which the link to be welded is left open and where the weld is formed; I, cavity or chamber in which a link sits up edgewise.

We construct our dies as follows: We first procure two blocks of steel of suitable size and quality and work them to a proper shape to attach them to a trip-hammer, a drop-press, or any other suitable device by which the dies can be forced together for the purpose of welding links into a chain. Among the various devices, we prefer the drop-press. The surfaces in which the cavities for the reception of the links are to be made are then finished off evenly, so that when the two faces are brought together they will touch at all points. A pattern is next prepared by which to lay out the faces of the dies E and F, and the work is done, in the usual manner of die-sinking, by drilling and chipping out the bulk of the metal to be removed, and finally finishing with scrapers and tools peculiar to the die-sinking trade.

It is a common practice to weld chain between dies, having but one cavity in each die for the reception of but one link; but we prefer having two or three, in order that the link that has been welded last may be properly formed simultaneous with welding the next in case it may have got out of shape while being handled.

We operate our dies as follows: To the anvil or anvil-block A is secured the lower die, E, and to the hammer is secured the upper die, F, in such a position that when the hammer C is allowed to drop each cavity in the die F will come directly over those corresponding in the die E. Round iron of the proper size is cut to a suitable length for links and bent to nearly the shape the link will be when welded, except the ends are spread apart for the purpose of hooking the link into the chain that has already been welded. Now, instead of forcing this link apart in such a manner as to describe a larger circle, we open it in a spiral shape, as shown at H, Fig. 2, so that when laid in the die E it will have the proper shape to enter the cavity H of the upper die when it is allowed to drop to form the weld. A quantity of links are next placed upon the edge of the fire, so that they will be heated to nearly the desired heat. The operator then takes one of the hottest of these and hooks it into the chain that may already be welded and plunges it into the hottest portion of the fire until it possesses a welding-heat, when it is speedily transferred to the cavities of the die E, as represented in Fig. 1. The operator then places his foot upon a foot-board, which frees the belt D and allows the hammer to drop upon the open link with great force, thus forming a most perfect weld.

Chains welded by the old method upon a beck-horn cannot possibly be welded perfectly uniform. The links will not be of uniform lengths, the welds cannot be made so perfect, nor will the size of the stock where the weld is formed be of the size that other portions of the link are; and, still further, the links will not be of uniform shape.

In using chain for transmitting motion from one machine to another, as is very often desirable, a perfect chain in every respect is requisite to perform the desired office properly. With cable-chains, which pass between peculiar geared wheels, it is necessary that the links be perfect in every respect, as the safety of valuable vessels, their cargoes, and more valuable lives depends almost entirely upon the perfect working of the cable.

We can, by welding links into chains between our dies, make a perfect chain in every respect, thus overcoming the difficulty heretofore existing in operating chains on machinery. At the same time a chain can be made with our dies at much less expense than by the old method, and the largest cable-chain can be made in the same length of time that the smallest chain is made, after the desired heat is once effected.

We do not claim as our invention the welding of links into a chain by means of dies; but What we do claim, and wish to secure by Letters Patent of the United States, is—

Forming the dies E and F with two or more cavities for the reception of two or more links, as and for the purpose specified.

FREDERICK VAN PATTEN.
OREN A. ANTHONY.

Witnesses:
THOS. RICHARDSON,
C. A. MOON.